United States Patent
Savelieva et al.

(10) Patent No.: US 11,669,374 B2
(45) Date of Patent: Jun. 6, 2023

(54) USING MACHINE-LEARNING METHODS TO FACILITATE EXPERIMENTAL EVALUATION OF MODIFICATIONS TO A COMPUTATIONAL ENVIRONMENT WITHIN A DISTRIBUTED SYSTEM

(71) Applicant: Microsoft Technology Licensing, LLC, Redmond, WA (US)

(72) Inventors: Alexandra Savelieva, Bellevue, WA (US); Srinivas Rao Choudam, Bothell, WA (US); Isidro Rene Hegouaburu, Kirkland, WA (US)

(*) Notice: Subject to any disclaimer, the term of this patent is extended or adjusted under 35 U.S.C. 154(b) by 0 days.

(21) Appl. No.: 17/884,829

(22) Filed: Aug. 10, 2022

(65) Prior Publication Data
US 2022/0383201 A1 Dec. 1, 2022

Related U.S. Application Data

(63) Continuation of application No. 16/132,212, filed on Sep. 14, 2018, now Pat. No. 11,423,326.

(51) Int. Cl.
*G06F 9/50* (2006.01)
*G06N 20/00* (2019.01)
(Continued)

(52) U.S. Cl.
CPC .......... *G06F 9/5072* (2013.01); *G06F 17/10* (2013.01); *G06F 18/217* (2023.01); *G06N 20/00* (2019.01); *H04L 41/0866* (2013.01)

(58) Field of Classification Search
None
See application file for complete search history.

(56) References Cited

U.S. PATENT DOCUMENTS

| | | | |
|---|---|---|---|
| 2015/0199364 A1* | 7/2015 | Nishi | G06Q 10/00 707/756 |
| 2015/0379369 A1* | 12/2015 | Liang | G06V 40/10 348/77 |

(Continued)

FOREIGN PATENT DOCUMENTS

WO 2015057537 A1 4/2015

OTHER PUBLICATIONS

"Office Action Issued in European Patent Application No. 19737437.4", dated Nov. 11, 2022, 9 Pages.

(Continued)

*Primary Examiner* — Toan H Vu
(74) *Attorney, Agent, or Firm* — Ray Quinney & Nebeker P.C; James Bullough

(57) ABSTRACT

The present disclosure provides an experimentation framework for a computational environment in a distributed system. A machine-learning model may be created that predicts at least one output produced by the computational environment based on at least one input provided to the computational environment. During an evaluation time period that is subsequent to at least one modification being made to the computational environment, at least one modified output produced by the computational environment may be determined. The machine-learning model may be used to calculate at least one predicted output that would have been produced by the computational environment during the evaluation time period if the at least one modification had not been made. A determination may also be made about how the at least one modification affected the computational environment based on a comparison of the at least one modified output and the at least one predicted output.

20 Claims, 12 Drawing Sheets

(51) Int. Cl.
*G06F 17/10* (2006.01)
*H04L 41/0866* (2022.01)
*G06F 18/21* (2023.01)

(56) References Cited

U.S. PATENT DOCUMENTS

| | | | |
|---|---|---|---|
| 2015/0379430 A1 | 12/2015 | Dirac et al. | |
| 2017/0161758 A1* | 6/2017 | Towriss | G06Q 30/0201 |
| 2017/0344609 A1* | 11/2017 | Wadley | G06F 16/24578 |
| 2017/0345074 A1* | 11/2017 | Wadley | G07F 19/201 |
| 2018/0024867 A1* | 1/2018 | Gilsdorf | G06F 1/183 |
| | | | 709/226 |
| 2019/0205792 A1* | 7/2019 | Huang | G06F 9/4881 |
| 2020/0004434 A1* | 1/2020 | Borlick | G06F 11/004 |
| 2021/0012047 A1* | 1/2021 | Nendorf | G06F 9/46 |
| 2021/0374610 A1* | 12/2021 | Dirac | G06N 20/00 |

OTHER PUBLICATIONS

"Office Action Issued in Indian Patent Application No. 202147006711", dated Nov. 24, 2022, 7 Pages.

* cited by examiner

USING MACHINE-LEARNING METHODS TO FACILITATE EXPERIMENTAL EVALUATION OF MODIFICATIONS TO A COMPUTATIONAL ENVIRONMENT WITHIN A DISTRIBUTED SYSTEM

CROSS-REFERENCE TO RELATED APPLICATIONS

This application is a Continuation of U.S. application Ser. No. 16/132,212, filed on Sep. 14, 2018, the entirety of which is incorporated herein by reference.

BACKGROUND

A distributed system is a computer system whose components are located on multiple computing devices. For example, a distributed system may include a plurality of distinct processing, memory, storage, and communication components that are connected by one or more communication networks. The various components of a distributed system may communicate with one another in order to coordinate their actions.

Distributed systems are becoming more complex with respect to the number and types of components that they include and also with respect to the interactions between these components. In addition, the number of users of a distributed system can be quite large (e.g., millions of users). Because of the complexity of distributed systems and the large numbers of users involved, a distributed system may be deployed on a large number (e.g., thousands) of computing devices. In some cases, these computing devices may be dispersed throughout a large geographical area.

Cloud computing systems are built using principles of distributed systems. Cloud computing enables access to a shared pool of configurable computing resources (e.g., networks, servers, storage, applications, services) that can be rapidly provisioned and released with minimal management effort or service provider interaction. The use of third-party cloud computing systems may enable organizations to focus more closely on their core businesses instead of expending resources on computer infrastructure and maintenance.

SUMMARY

A method for experimenting with modifications to a computational environment within a distributed system is disclosed. In accordance with the method, a machine-learning model for the computational environment may be created. The machine-learning model may predict at least one output produced by the computational environment based on at least one input provided to the computational environment. When at least one modification is made to the computational environment, the method may include determining at least one modified output produced by the computational environment during an evaluation time period that is subsequent to the at least one modification being made. In addition, the machine-learning model may be used to calculate at least one predicted output that would have been produced by the computational environment during the evaluation time period if the at least one modification had not been made to the computational environment. The at least one modified output and the at least one predicted output may be compared to produce comparison information that shows one or more differences between the at least one modified output and the at least one predicted output. An indication of how the at least one modification affected the computational environment may be output.

The method may additionally include validating the machine-learning model to verify that the at least one predicted output satisfies at least one validation condition with respect to the at least one modified output. In some implementations, the at least one modification may be made to the computational environment after the machine-learning model has been created and validated.

Calculating the at least one predicted output may include providing the at least one input to a simulated computational environment during the evaluation time period. The simulated computational environment may utilize the machine-learning model to simulate performance of the computational environment as if the at least one modification had not been made to the computational environment.

In some implementations, the machine-learning model may be created subsequent to the at least one modification being made to the computational environment. In such implementations, the machine-learning model may be created based on historical data.

The at least one modification to the computational environment may involve at least one of a software configuration of the computational environment, a hardware configuration of the computational environment, or a traffic load associated with the computational environment.

Outputting the indication may occur in response to detecting that a difference between the at least one modified output and the at least one predicted output exceeds a threshold. In some implementations, the method may additionally include taking corrective action with respect to the computational environment in response to the indication.

A system for experimenting with modifications to a computational environment within a distributed system is also disclosed. The system includes one or more processors and memory comprising instructions that are executable by the one or more processors to perform the operations described above. A non-transitory computer-readable medium is also disclosed. The non-transitory computer-readable medium includes computer-executable instructions stored thereon that, when executed, cause one or more processors to perform the operations described above.

DETAILED DESCRIPTION

Figure 1A:
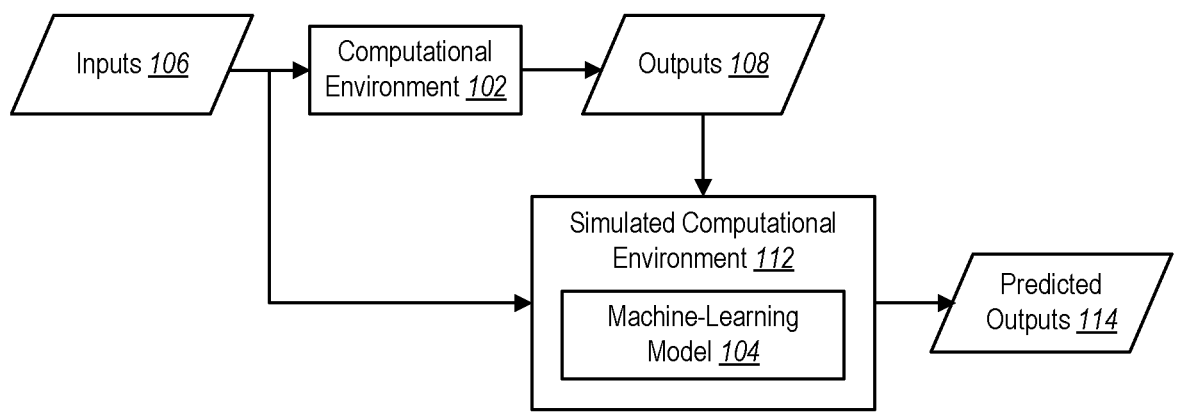
FIGS. 1A-C illustrate aspects of an experimentation framework in accordance with the present disclosure.

From time to time, it may be desirable to modify the configuration of a distributed system. For example, it may be desirable to change the software configuration of a distributed system by installing (or uninstalling) one or more software components or changing software settings. As another example, it may be desirable to change the hardware configuration of a distributed system by adding (or removing) processing, memory, storage, and/or communication components. It may also be desirable to make other types of changes to a distributed system. In a distributed system that serves content to client devices, such changes may affect the amount and/or the type of traffic (e.g., requests from client devices) that the various components of the distributed system receive.

To determine how particular changes will affect a distributed system, various types of testing may be performed. One type of testing is commonly referred to as A/B testing. With A/B testing, one set of computing devices (e.g., one or more edge nodes) within a distributed system may be designated as a control group that utilizes an existing configuration. Another set of nodes within the distributed system may be designated as an experimental group. The proposed changes may be applied to the experimental group, and the performance of the experimental group may be compared with the performance of the control group to determine the effects of the proposed changes.

When performing A/B testing, it is important to ensure that the control group is equivalent to the experimental group, both in terms of software and hardware configuration and also with respect to other factors (such as traffic volume and patterns of traffic, for example). If the control group is not equivalent to the experimental group, then any differences in performance that are detected during the testing process may not necessarily be due to the proposed changes that are the subject of the testing.

In some situations, A/B testing may be performed in an experimental setting before changes are applied to a system that is in production (e.g., a system that has been made available to intended users). With this approach, synthetic traffic may be generated to measure parity between a control group and an experimental group. One significant problem is that the quality of the synthetic traffic has to be extremely high to enable accurate measurement of the configuration changes that are being tested. In a complex distributed system, a substantial amount of investment (both in terms of time and money) may be required to enable the accurate emulation of a production workload in an experimental setting. Because of the tremendous costs that are involved, testing in production (e.g., testing after the system has been made available to intended users) may be a preferred option for many types of distributed systems despite the associated risks, such as having users experience degraded performance.

One approach for A/B testing in production involves experimenting on a few selected machines within a single environment. However, this approach covers a very limited set of scenarios and requires either manual intervention into the deployment of a custom configuration or significant investments into automation. This approach does not scale well, and it is particularly unsuitable for a cloud computing environment.

Another approach for A/B testing in production involves the use of split environments. With this approach, the computing devices within a particular environment (e.g., a particular geographical location) may be divided into a control group and an experimental group. A distributed system may include a large number of computational devices in many different types of environments. In some cases, only certain environments of a distributed system may be split into a control group and an experimental group. Alternatively, environments of a distributed system may be split. In either case, the practical implementation of this approach is difficult.

For example, if only certain environments of a distributed system are split into a control group and an experimental group, this may create problems with respect to extrapolation of experimental results. The software and hardware configurations of the split environments may not be equivalent to the software and hardware configurations of the nodes within other environments. In addition, the distribution of traffic to the split environments may not be equivalent to the distribution of traffic to the other environments.

However, splitting the nodes within all of the environments of a distributed system into a control group and an experimental group may also be undesirable. The costs (in terms of both time and money) of splitting an entire distributed system in this way can be quite significant. Also, there may be undesirable consequences, such as reducing the shedding effectiveness (the ability of an edge node to rid itself of some or all of its traffic). Furthermore, the effectiveness of A/B testing in split environments relies on the ability to equally spread the traffic load between split environments. While load balancing components are available, in practice traffic loads may not always be randomly distributed. For example, incoming requests associated with a certain type of traffic may be sent to the control group more than the experimental group, or vice versa. As a result, performance metrics may become incomparable, which may cause serious errors in the evaluation of an experiment. Also, discrepancies in the functioning of underlying environment-level hardware may cause systematic errors (e.g., one split environment may consistently show higher Transmission Control Protocol (TCP) retransmission rates than the other).

Another way to determine how particular changes will affect a distributed system relies on the use of time-series forecasting models. For example, data for a control group may be emulated by applying time-series forecasting models for metrics that follow certain patterns during a day. However, this approach relies on the assumption that the data follows specific seasonal patterns, and this assumption may not always be valid. Changes with respect to user behavior (e.g., changes related to industry events, such as technical conferences, or releases of particular games or applications) and/or changes with respect to infrastructure (e.g., peering reconfiguration, outages, and maintenance) may significantly affect the volume and the mix of incoming traffic, thereby shifting relevant performance metrics in a way that may make forecasted data unusable.

The present disclosure is generally related to an experimentation framework for a distributed system. An experimentation framework in accordance with the present disclosure may make it possible to accurately evaluate the efficiency of particular modifications to a distributed system without the significant costs and technical challenges associated with known approaches to AB testing in the context of distributed systems.

An experimentation framework as disclosed herein may be applied to one or more computational environments within a distributed system. In this context, the term "computational environment" may refer to any set of computing resources within a distributed system, including hardware resources (e.g., processing, memory, storage, communication) and/or software resources. A computational environment may include multiple computing devices or just a single computing device. The computing devices within a computational environment may be located within the same geographical area, or they may be dispersed across different geographical areas.

An experimentation framework as disclosed herein may leverage machine-learning for evaluation of experimental results. In accordance with the present disclosure, machine-learning techniques may be utilized to create a machine-learning model for the computational environment. The machine-learning model may be a function that predicts one or more outputs of the computational environment based on one or more inputs to the computational environment. As will be discussed in greater detail below, the output(s) may include one or more metrics (or a combination thereof) that indicate the efficiency of the computational environment. Thus, the machine-learning model may predict the efficiency of the computational environment based on one or more inputs to the computational environment.

In this context, the term "input" refers to any feature or characteristic of the computational environment that may potentially affect the performance of the computational environment. There may be at least three general categories of inputs to a computational environment: inputs related to a hardware configuration of the computational environment, inputs related to a software configuration of the computational environment, and inputs related to traffic associated with the computational environment.

The hardware configuration of a computational environment includes the physical components that affect the performance of the computational environment. Some examples of inputs to a computational environment that are related to a hardware configuration include the amount of memory, the disk size, the number of processors, the types of processors, and communication bandwidth.

The software configuration of a computational environment includes the programs, routines, settings, and data that direct the operation of the computational environment. A few examples of inputs to a computational environment that are related to a software configuration include the build version of a particular piece of software, the operating system (OS) version, OS-level controls (e.g., the congestion window for the TCP protocol), and network-level controls.

As used herein, the term "traffic load" refers to characteristics or factors associated with a computational environment that are unrelated to the hardware configuration or the software configuration but that nonetheless may affect the performance of the computational environment. Such characteristics or factors may include traffic volume (the amount of traffic that a computational environment receives) and traffic patterns (how the traffic volume varies over time). While some characteristics of a traffic load may be within the control of individuals who are responsible for administering the computational environment, at least some characteristics of a traffic load may be outside of the control of such individuals. A few examples of inputs to a computational environment that are related to a traffic load include the number of client requests that are received over a particular period of time (e.g., requests per second), the network bandwidth (referring to the capacity of the communication channel between the computational environment and requesting clients), and routing decisions that affect the types of traffic that are being routed to the computational environment.

In the context of a machine-learning model as disclosed herein, the term "output" refers to any metric that provides information about the performance (or efficiency) of the computational environment. A few examples of outputs include central processing unit (CPU) utilization, memory utilization, throughput, latency, power consumption, and cache hit ratio.

The specific examples of inputs and outputs that are provided above should not be interpreted as limiting the scope of the present disclosure. There are many additional examples of inputs and outputs that could be utilized in accordance with the present disclosure. As noted above, a machine-learning model may be a function that predicts one or more outputs of the computational environment based on one or more inputs to the computational environment. However, a machine-learning model in accordance with the present disclosure is not limited to any particular set of inputs or outputs. The specific set of input(s) and output(s) that are appropriate for a particular implementation will depend on what the goals of the implementation are.

In addition, the scope of the present disclosure should not be limited to any particular type of machine-learning method or algorithm. Those skilled in the art will recognize that many different kinds of machine-learning methods and algorithms may be utilized to create a machine-learning model in accordance with the present disclosure. The machine-learning techniques that are optimal for a particular implementation will depend on what the goals of the implementation are.

Once a machine-learning model corresponding to a particular computational environment has been created and validated, it may then be used to evaluate the efficiency of modifications to the computational environment. More specifically, after one or more changes have been made to the computational environment, the machine-learning model may be used to predict one or more outputs that would have been produced by the computational environment if the changes had not been made. By comparing the outputs that are predicted by the machine-learning model with the actual observed outputs of the computational environment itself, the efficiency of the changes to the computational environment may be evaluated.

An experimentation framework in accordance with the present disclosure provides a number of advantages relative to known approaches. For example, the disclosed experimentation framework makes it possible to experiment with any type of computational environment, regardless of whether or not there is another similar computational environment that is available for testing (as would be required with conventional AB testing).

The disclosed experimentation framework also makes it possible to monitor changes to a computational environment in real time, as actual users are interacting with the computational environment. In addition to facilitating evaluation of efficiency improvements, this feature also makes it possible to alert users about regressions (i.e., degradations to the performance of a computational environment). For example, when regressions are detected, one or more alerts may be provided to appropriate individuals (e.g., individuals who are responsible for administering the computational environment). This can be particularly useful for a real-time production system. In some situations, when regressions are detected, the techniques disclosed herein may be utilized to determine whether particular changes are likely to have caused the regressions. This type of analysis may be performed either in real time, as indicated, or in some cases historical data may be used for such analysis.

Figure 1B:
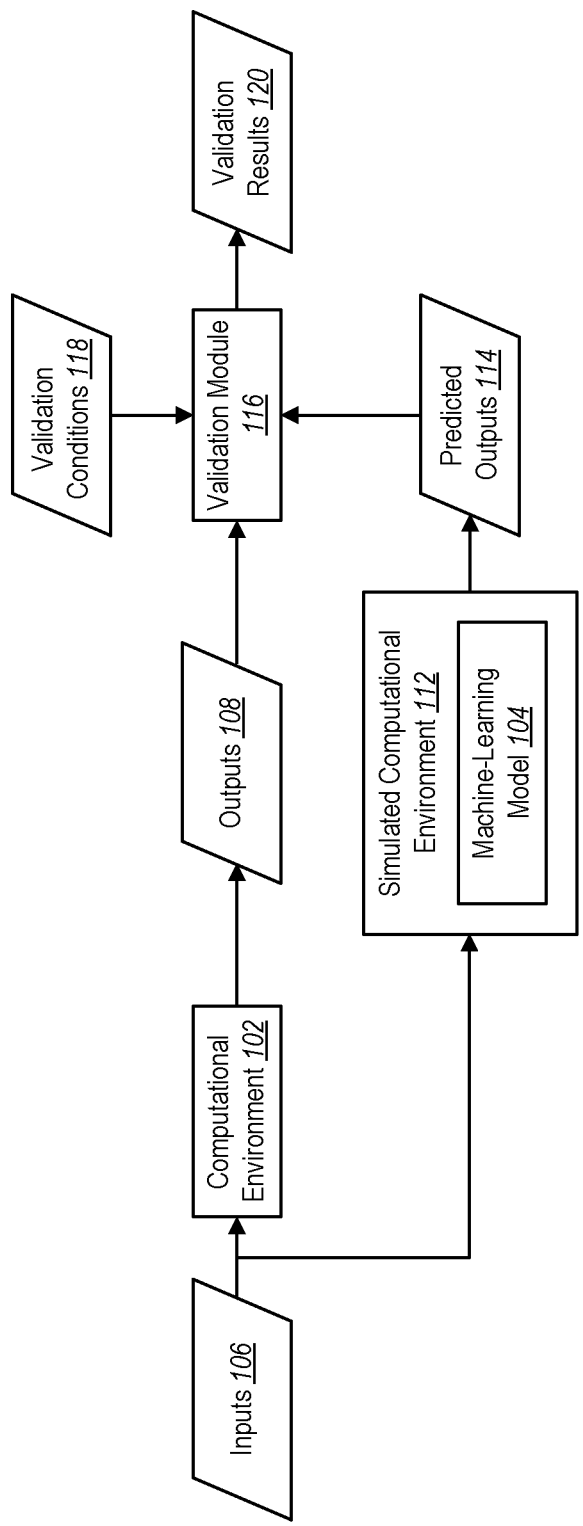
Figure 1C:
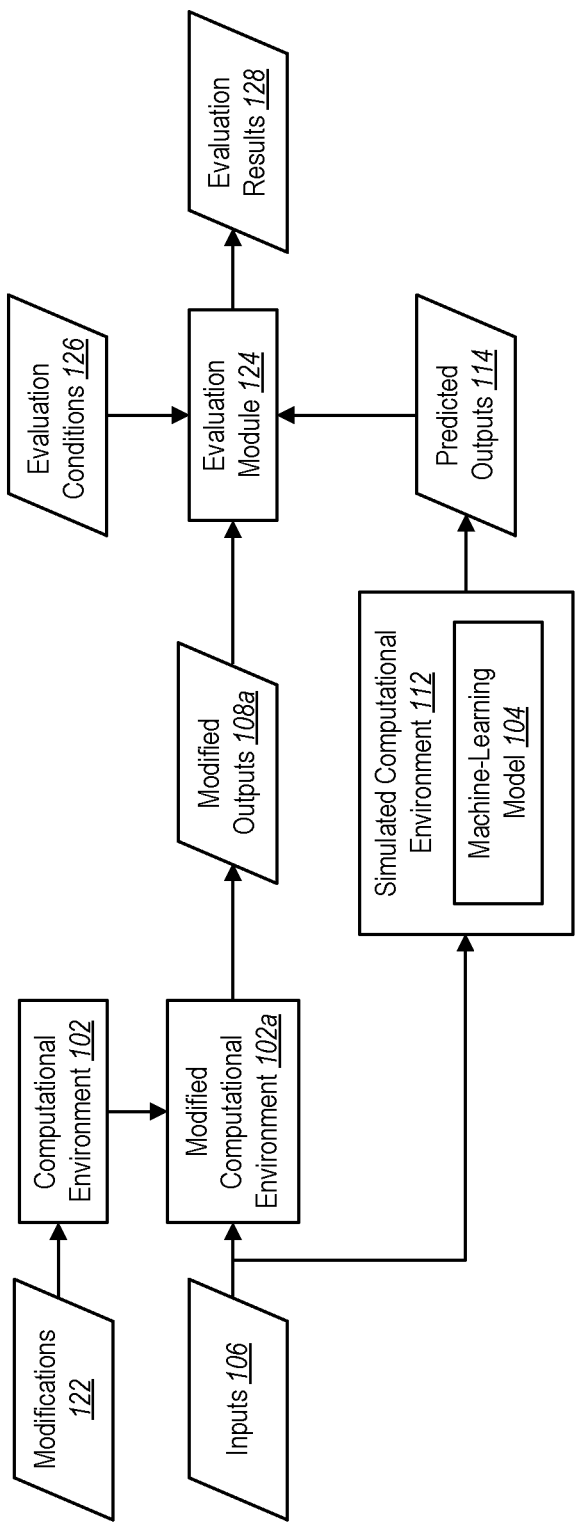

FIG. 1A-C illustrate aspects of an experimentation framework in accordance with the present disclosure. The experimentation framework may be applied to a computational environment 102 within a distributed system. Implementing the experimentation framework may involve the creation of a machine-learning model 104 corresponding to the computational environment 102. FIG. 1A illustrates aspects of the experimentation framework related to creation of the machine-learning model 104. FIG. 1B illustrates aspects related to validating the machine-learning model 104. FIG. 1C illustrates aspects related to using the machine-learning model 104 to evaluate the efficiency of one or more changes to the computational environment 102.

Reference is initially made to FIG. 1A. One or more inputs 106 may be provided to the computational environment 102, and one or more outputs 108 may also be produced by the computational environment 102. The inputs 106 provided to the computation environment 102 and the outputs 108 produced by the computational environment 102 may be provided to a simulated computational environment 112, which utilizes machine-learning techniques to create a simulated version of the computational environment 102. In some implementations, the simulated computational environment 112 may run on the same hardware components as the computational environment 102 itself Alternatively, the simulated computational environment 112 may run on different hardware components. Wherever it is implemented, the simulated computational environment 112 may evaluate the inputs 106 and the outputs 108 to create a machine-learning model 104. The machine-learning model 104 may be a function that predicts one or more outputs 108 of the computational environment 102 based on one or more inputs 106 to the computational environment 102.

As indicated above, the inputs 106 to the computational environment 102 may be broadly categorized into inputs 106 related to a hardware configuration of the computational environment 102, inputs 106 related to a software configuration of the computational environment 102, and inputs 106 related to a traffic load associated with the computational environment 102. In some implementations, the training of the machine-learning model 104 may occur during a time period when inputs 106 related to the hardware and software configuration of the computational environment 102 do not change. Keeping the hardware and software configuration of the computational environment 102 constant during the training of the machine-learning model 104 may simplify the process of creating the machine-learning model 104. However, the scope of the present disclosure should not be limited in this regard. The training of the machine-learning model 104 may occur during a time period when inputs 106 related to the hardware and/or software configuration of the computational environment 102 do change. Data related to these changes may be gathered, and the changes may be accounted for via parameters in the machine-learning model 104.

After the simulated computational environment 112 has been provided with a sufficient amount of data (inputs 106 and outputs 108) so that the predictions made by the machine-learning model 104 are likely to be accurate, the machine-learning model 104 may be validated. For example, the machine-learning model 104 may be validated after the inputs 106 and the outputs 108 corresponding to a defined amount of time have been evaluated. The amount of time depends on the specific implementation. For some implementations, it may be possible to create a sufficiently accurate machine-learning model 104 using data from a relatively short period of time. This may be the case, for example, where there are many inputs 106 and outputs 108 occurring frequently. For other kinds of implementations, it may be desirable to wait until data corresponding to a longer period of time (e.g., minutes, hours, days) has been evaluated before the machine-learning model 104 is validated.

Reference is now made to FIG. 1B, which illustrates an example showing how the machine-learning model 104 may be validated. In general terms, the purpose of validating the machine-learning model 104 is to determine whether the predictions made by the machine-learning model 104 are sufficiently accurate so that they may be reasonably relied upon for purposes of evaluating changes to the computational environment 102.

To facilitate validation, the simulated computational environment 112 may utilize the machine-learning model 104 to determine predicted outputs 114, which are predictions about what the outputs of the computational environment 102 will be based on the inputs 106 to the computational environment 102. Therefore, during validation, the inputs 106 may be provided both to the computational environment 102 itself and also to the simulated computational environment 112. However, the outputs 108 of the computational environment 102 should not be provided to the simulated computational environment 112 during validation, because the purpose of validation is to test the accuracy of the machine-learning model 104. The simulated computational environment 112 should be allowed to make predictions about what the outputs of the computational environment 102 will be without knowledge of the actual outputs 108 of the computational environment 102.

To evaluate the accuracy of the machine-learning model 104, the actual observed outputs 108 produced by the computational environment 102 may be compared with the predicted outputs 114 produced by the simulated computational environment 112. A validation module 116 is shown in FIG. 1B for providing this functionality.

The validation module 116 may determine whether one or more validation conditions 118 are satisfied, and the validation module 116 may output one or more validation results 120. The validation conditions 118 may define the circumstances under which a machine-learning model 104 is considered to have been validated. In some implementations, the validation conditions 118 may define an acceptable range for the differences between the predicted outputs 114 and the observed outputs 108. For example, one or more thresholds may be defined that represent the maximum allowable differences between the predicted outputs 114 and the observed outputs 108. If the differences between the predicted outputs 114 and the observed outputs 108 are within the acceptable range (e.g., less than the relevant thresholds), then the validation results 120 may indicate that validation of the machine-learning model 104 has been successful. On the other hand, if the differences between the predicted outputs 114 and the observed outputs 108 are not within the acceptable range, then the validation results 120 may indicate that validation of the machine-learning model 104 has been unsuccessful.

If the validation of the machine-learning model 104 is not successful, there may not have been a sufficient amount of data for training. Thus, additional time (and/or additional data) may be devoted to training the machine-learning model 104. It may be possible to go back in time and retrieve historical data (if it is available) that could be used to provide additional training for the machine-learning model 104.

In some cases, if the machine-learning model 104 is not validated, this may indicate that certain assumptions about the machine-learning model 104 may be incorrect. For example, suppose that for purposes of creating the machine-learning model 104 an assumption is made that the software and hardware configurations of the computational environment 102 are substantially constant. Further suppose, however, that a change to one or both of these configurations takes place during the training period. In this example, validation may fail because the machine-learning model 104 does not account for those changes. To address this failure, one approach may be to identify the point in time when the change(s) to the software and/or hardware configuration took place, and then begin training the machine-learning model 104 from that point forward. Another approach may be to add additional parameters (corresponding to the changed aspects of the software and/or hardware configurations) to the machine-learning model 104 itself.

If the validation of the machine-learning model 104 is successful, then the machine-learning model 104 may be used to evaluate changes that may be made to the computational environment 102. Advantageously, this may be done in real time. Referring now to FIG. 1C, one or more modifications 122 may be made to the computational environment 102. The modifications 122 may include changes to the software configuration and/or the hardware configuration of the computational environment 102. The modifications 122 may also include other types of changes to the computational environment 102, including changes to traffic load experienced by the computational environment 102. For example, the type of traffic that gets routed to the computational environment 102 may be changed. The modifications 122 may result in a modified computational environment 102a that produces modified outputs 108a. The modified outputs 108a are outputs (as that term is defined above) that are produced by the modified computational environment 102a after the modifications 122 have been made.

To determine the effect of the modifications 122, the predicted outputs 114 produced by the simulated computational environment 112 may be compared with the modified outputs 108a produced by the modified computational environment 102a. An evaluation module 124 is shown for providing this functionality. The evaluation module 124 may compare the predicted outputs 114 and the modified outputs 108a based on one or more evaluation conditions 126 that may be defined. The predicted outputs 114 are a prediction of the outputs that would have been produced by the computational environment 102 if the modifications 122 had not been made. Thus, by comparing the predicted outputs 114 with the modified outputs 108a (which correspond to the actual observed outputs of the modified computational environment 102a), it may be possible to determine what effects (if any) the modifications 122 have had on the performance of the computational environment 102. The evaluation module 124 may output evaluation results 128 that describe these effects.

There are a variety of ways that the evaluation results 128 may be output. For example, the evaluation results 128 may be displayed on one or more display screens. As another example, one or more notification messages may be sent to one or more individuals who are responsible for administering the computational environment 102. The notification messages may include at least some of the evaluation results 128. In some cases, the evaluation results 128 may be output if the difference between predicted outputs 114 and modified outputs 108a is significant (e.g., exceeds a threshold).

The comparison of the predicted outputs 114 with the modified outputs 108a may occur in real time. In other words, at substantially the same time as the modified computational environment 102a is running and producing modified outputs 108a, the simulated computational environment 112 may produce predicted outputs 114. Thus, it may be possible to compare the predicted outputs 114 with the modified outputs 108a at substantially the same time as the modified outputs 108a are being produced.

If the modified outputs 108a being produced by the modified computational environment 102a deviate too much from the predicted outputs 114, this may indicate that the modifications 122 caused a problem. One or more individuals who are responsible for administering the computational environment 102 may be notified about the potential problem, and they may choose to roll back the modifications 122. For example, if the comparison of the predicted output(s) 114 and the modified output(s) 108a indicates that the modification 122 had a harmful effect on the computational environment 102, then an administrator of the computational environment 102 may undo the modification 122.

The evaluation conditions 126 may define how the predicted outputs 114 and the modified outputs 108a are to be compared. In some implementations, both the predicted outputs 114 and the modified outputs 108a may be expressed in terms of an efficiency metric. To determine the effects of the modifications 122 on the performance of the computational environment 102, the evaluation conditions 126 may specify that an efficiency metric corresponding to the predicted outputs 114 may be compared with an efficiency metric corresponding to the modified outputs 108a.

Figure 2:
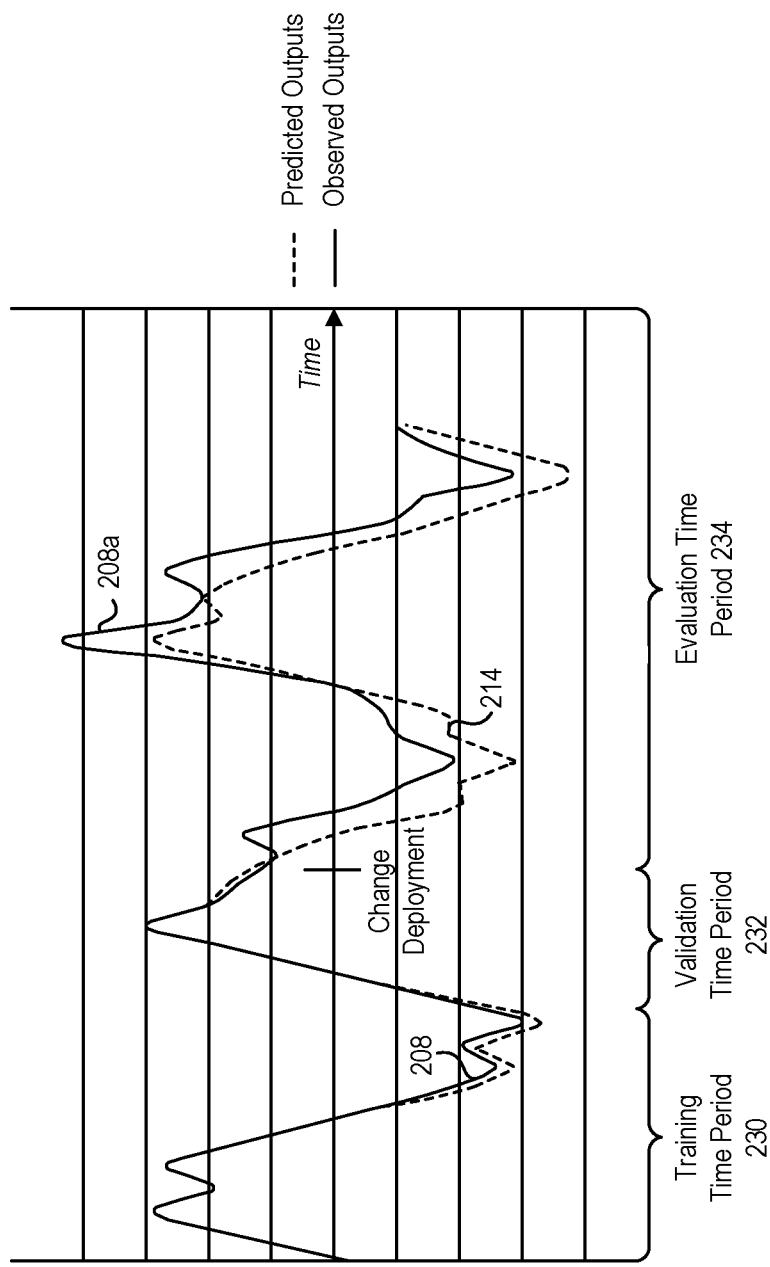
FIG. 2 illustrates an example of a comparison of the actual observed outputs produced by a computational environment and the predicted outputs produced by a simulated version of the computational environment.

FIG. 2 is a graph that illustrates an example of a comparison of the actual observed outputs 208 produced by a computational environment (e.g., the computational environment 102) and the predicted outputs 214 produced by a simulated version of the computational environment (e.g., the simulated computational environment 112). For the sake of clarity, the graph will be explained in relation to the various components of the experimentation framework illustrated in FIGS. 1A-C.

In the depicted example, both the observed outputs 208 and the predicted outputs 214 are represented in terms of an efficiency metric. The efficiency metric may represent just a single output, or it may represent the (possibly weighted) combination of several outputs. The x-axis of the graph shown in FIG. 2 corresponds to time, and the y-axis of the graph corresponds to values of the efficiency metric (for both the observed outputs 208 and the predicted outputs 214) at various points in time.

Three different time periods are represented on the graph: a training time period 230, a validation time period 232, and an evaluation time period 234. During the training time period 230, the simulated computational environment 112 creates a machine-learning model 104. Because the simulated computational environment 112 has access to the outputs 208 of the computational environment 102 during the training time period 230, the predicted outputs 214 produced by the simulated computational environment 112 are very close to the actual observed outputs produced by the computational environment 102 during the training time period 230.

During the validation time period 232, the accuracy of the machine-learning model 104 is tested. In the depicted example, the predicted outputs 214 produced by the simulated computational environment 112 during the validation time period 232 are very close to the actual observed outputs 208 produced by the computational environment 102 during the validation time period 232. Therefore, in this example, the validation of the machine-learning model 104 may be considered to be successful.

During the evaluation time period 234, the machine-learning model 104 may be used to evaluate the effect of modifications 122 that are made to the computational environment 102. In the depicted example, the modifications 122 change the performance of the computational environment 102 so that the performance of the modified computational environment 102a is different than the performance of the computational environment 102. Thus, there is a difference between the modified outputs 208a produced by the modified computational environment 102a and the predicted outputs 214 produced by the simulated computational environment 112. By comparing the modified outputs 208a and the predicted outputs 214, it may be possible to evaluate the effects of the modifications 122 that were made to the computational environment 102.

Figure 3:
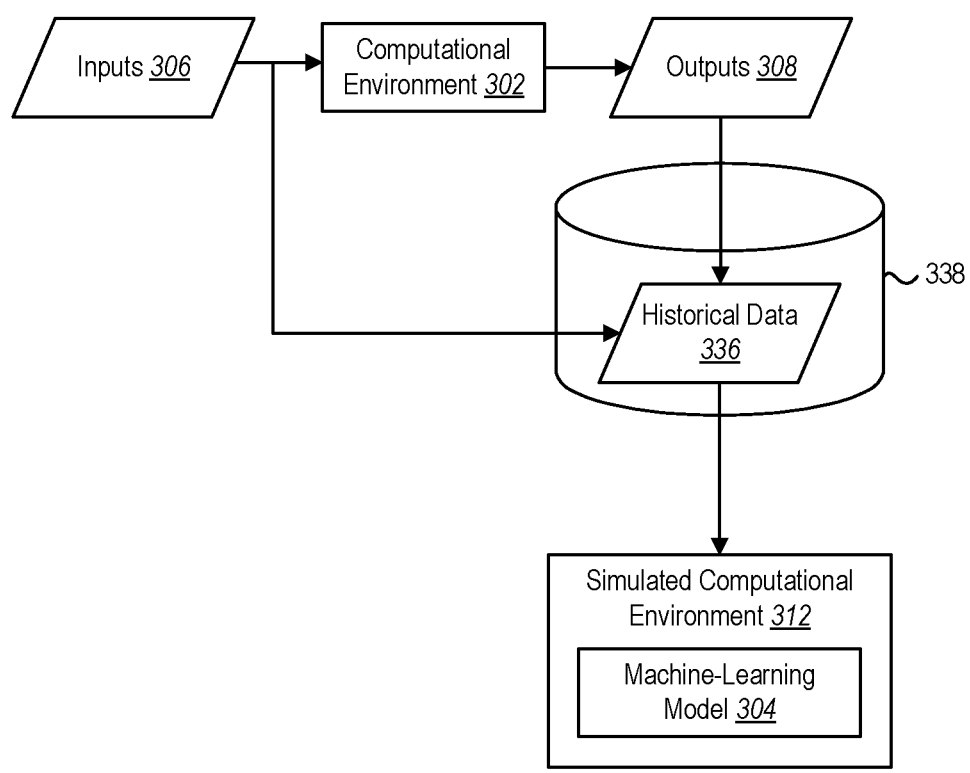
FIG. 3 illustrates additional aspects of an experimentation framework related to determining a machine-learning model based on historical data.

FIG. 3 illustrates additional aspects of an experimentation framework in accordance with the present disclosure. In the example shown in FIG. 3, the machine-learning model 304 may be determined based on historical data 336 (i.e., data that has been saved from past events). More specifically, the inputs 306 provided to a computational environment 302 and the outputs 308 produced by the computational environment 302 may be stored as historical data 336. Then, at some subsequent point in time, a simulated computational environment 312 may evaluate the historical data 336 to create a machine-learning model 304 for the computational environment 302.

One benefit of the approach depicted in FIG. 3 is that it provides additional flexibility with respect to when modifications to a computational environment 302 can be evaluated. For example, suppose that administrators of a distributed system modify a computational environment 302 before they have created a machine-learning model 304 for the computational environment 302. Further suppose that the performance of the computational environment 302 changes dramatically after the modifications are made, and the administrators want to try to determine whether the change in performance is caused by the modifications. If the inputs 306 and outputs 308 corresponding to the computational environment 302 have been saved as historical data 336, it may still be possible to utilize the techniques disclosed herein to evaluate the effects of the modifications to the computational environment 302 even though the modifications have already been made. In other words, through the use of historical data 336 corresponding to a period of time before the modifications were made to the computational environment 302, it may be possible to create a machine-learning model 304 that simulates the performance of the computational environment 302 before the modifications were made. Advantageously, this may be done at a point in time after the modifications to the computational environment 302 have already been made. The actual observed outputs 308 of the computational environment 302 after the modification may be compared with predictions made by the machine-learning model 304 to see whether the modifications caused the degradation in performance that has been observed.

It is often the default behavior of a production system to retain historical telemetry signals over some time. Therefore, in cases where the computational environment 302 includes a production system, it may frequently be the case that inputs 306 and outputs 308 corresponding to the computational environment 302 are likely to be available as historical data 336. Moreover, even if historical data 336 including inputs 306 and outputs 308 is not available, it may still be possible to evaluate the effects of the modifications to the computational environment 302 after the modifications have already been made if data is preserved corresponding to other parameters of the machine-learning model 304. Such data may occupy less storage space than historical data 336 including inputs 306 and outputs 308.

A storage component 338 is shown in FIG. 3 for storing the historical data 336. Although just a single storage component 338 is shown in FIG. 3, multiple storage components may be utilized to store the historical data 336.

Figure 4:
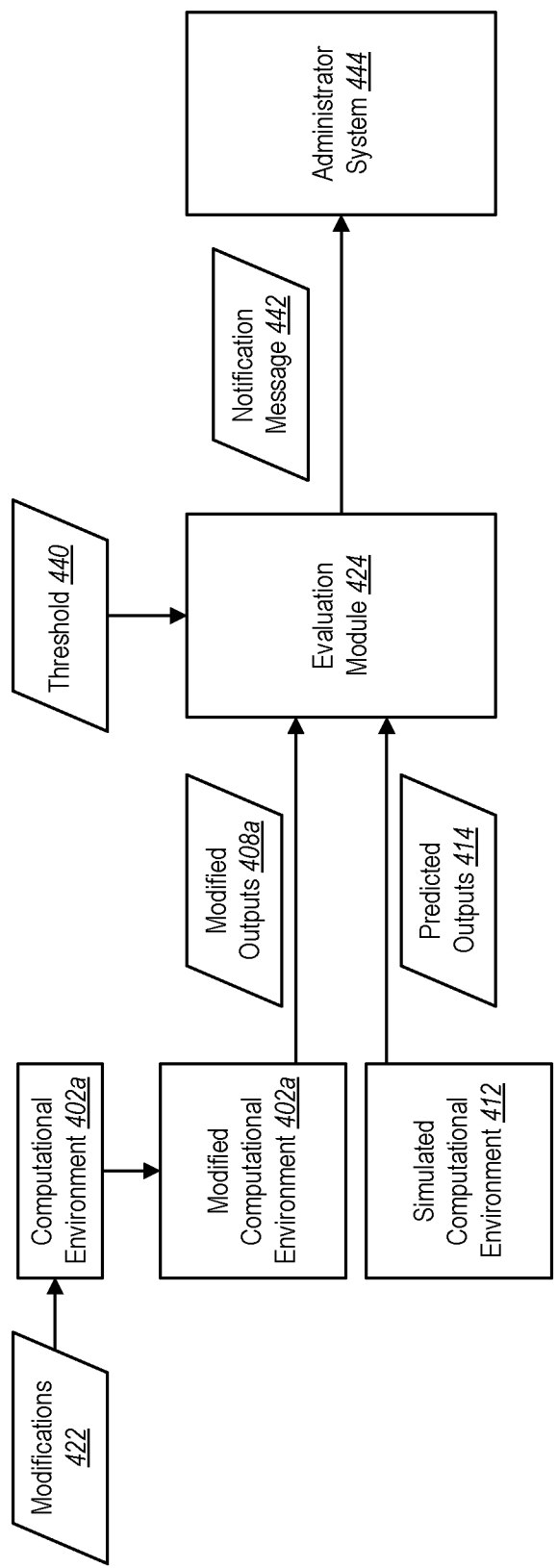
FIG. 4 illustrates additional aspects of an experimentation framework related to triggering certain actions in response to determining information about modifications to a computational environment.

FIG. 4 illustrates additional aspects of an experimentation framework in accordance with the present disclosure. More specifically, FIG. 4 illustrates how information that is determined about modifications 422 to a computational environment 402 may trigger certain actions.

As discussed previously, predicted outputs 414 produced by a simulated computational environment 412 may be compared with modified outputs 408a produced by a modified computational environment 402a. An evaluation module 424 is shown for providing this functionality. The evaluation module 424 may be configured to take one or more actions when certain conditions are satisfied.

For example, when the differences between the modified outputs 408a and the predicted outputs 414 reach a certain point, this may indicate that the performance of the modified computational environment 402a has degraded to an unacceptable level. One or more thresholds 440 may be defined that indicate when the differences between the modified outputs 408a and the predicted outputs 414 have become excessive. In response to detecting that the differences between the modified outputs 408a and the predicted outputs 414 exceed a defined threshold 440, one or more actions may be taken. For example, in response to determining that the threshold 440 has been exceeded, the evaluation module 424 may automatically send one or more notification messages 442 to interested parties. In FIG. 4, the evaluation module 424 is shown sending a notification message 442 to an administrator system 444, which is intended to represent a computer system associated with someone who is in a position of authority with respect to the distributed system (e.g., an IT administrator).

Figure 5A:
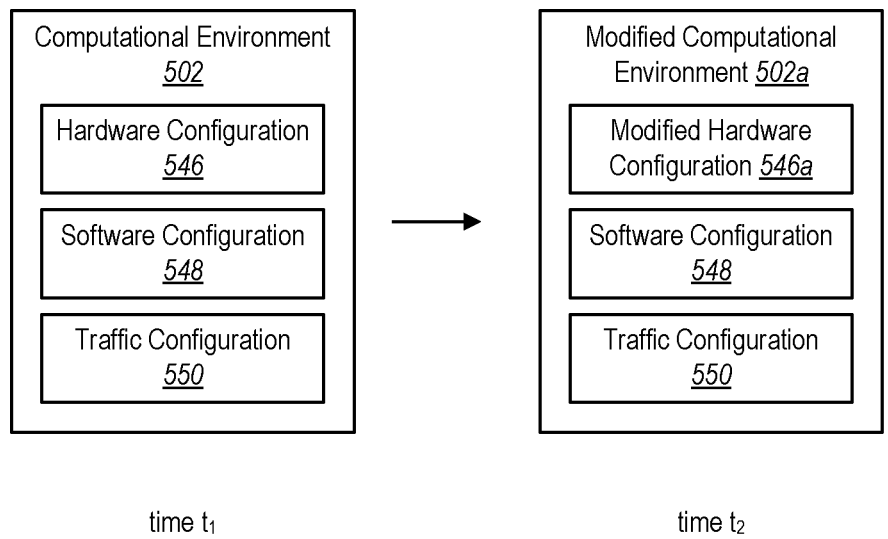
FIGS. 5A-C illustrate examples of different kinds of modifications that may be made to the configuration of a computational environment.
Figure 5B:
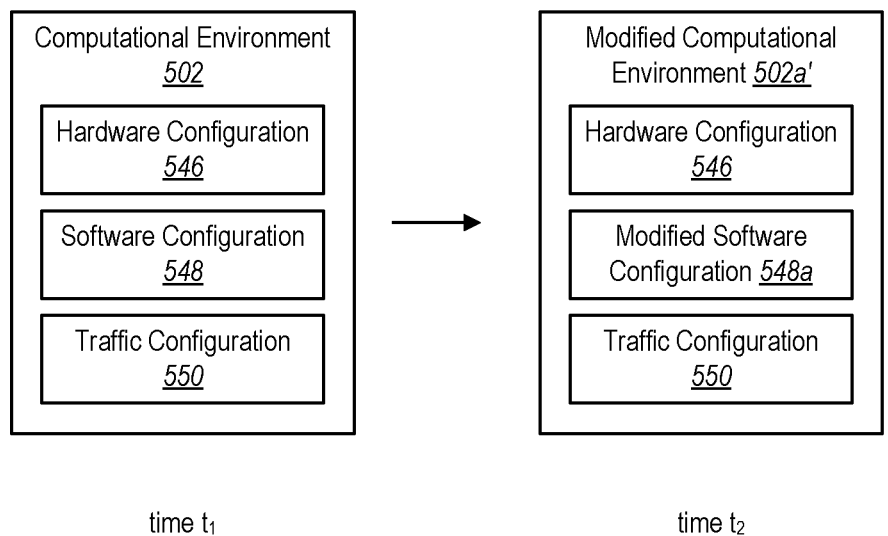
Figure 5C:
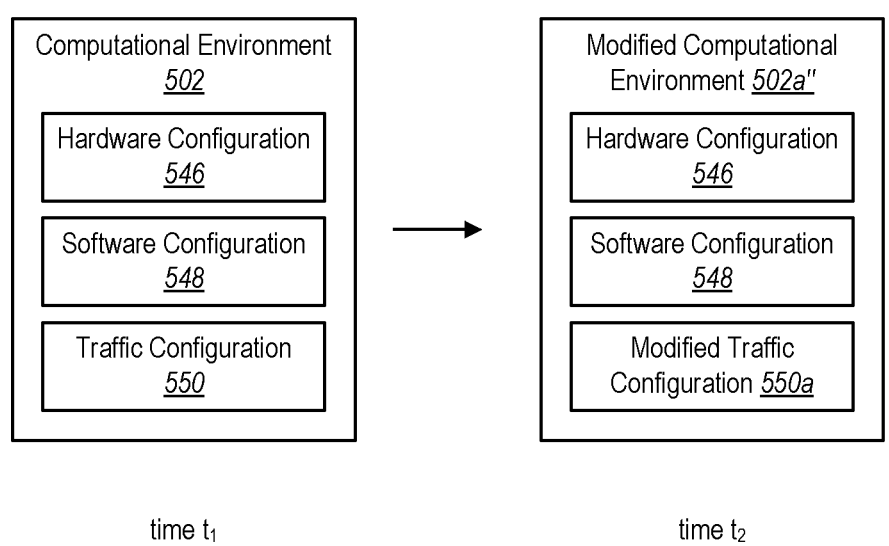

FIGS. 5A-C illustrate examples of different kinds of modifications that may be made to the configuration of a computational environment 502. In each of FIGS. 5A-C, the computational environment 502 is shown at time ti with a hardware configuration 546, a software configuration 548, and a traffic configuration 550. A modified computational environment is shown at time $t_2$.

In FIG. 5A, the modified computational environment 502a includes a modified hardware configuration 546a, but the software configuration 548 and traffic configuration 550 are the same as in the computational environment 502. Thus, FIG. 5A illustrates a scenario in which one or more modifications have been made to the hardware configuration 546 of the computational environment 502.

In FIG. 5B, the modified computational environment 502a' includes a modified software configuration 548a, but the hardware configuration 546 and traffic configuration 550 are the same as in the computational environment 502. Thus, FIG. 5B illustrates a scenario in which one or more modifications have been made to the software configuration 548 of the computational environment 502.

In FIG. 5C, the modified computational environment 502a'' includes a modified traffic configuration 550a, but the hardware configuration 546 and software configuration 548 are the same as in the computational environment 502. Thus, FIG. 5C illustrates a scenario in which one or more modifications have been made to the traffic configuration 550 of the computational environment 502.

Of course, various combinations of the modifications shown in FIGS. 5A-C are also possible in accordance with the present disclosure. The techniques disclosed herein may be utilized to evaluate the efficiency of many different types of modifications, including modifications to the hardware configuration 546, the software configuration 548, and/or the traffic configuration 550 of a computational environment 502.

Figure 6:
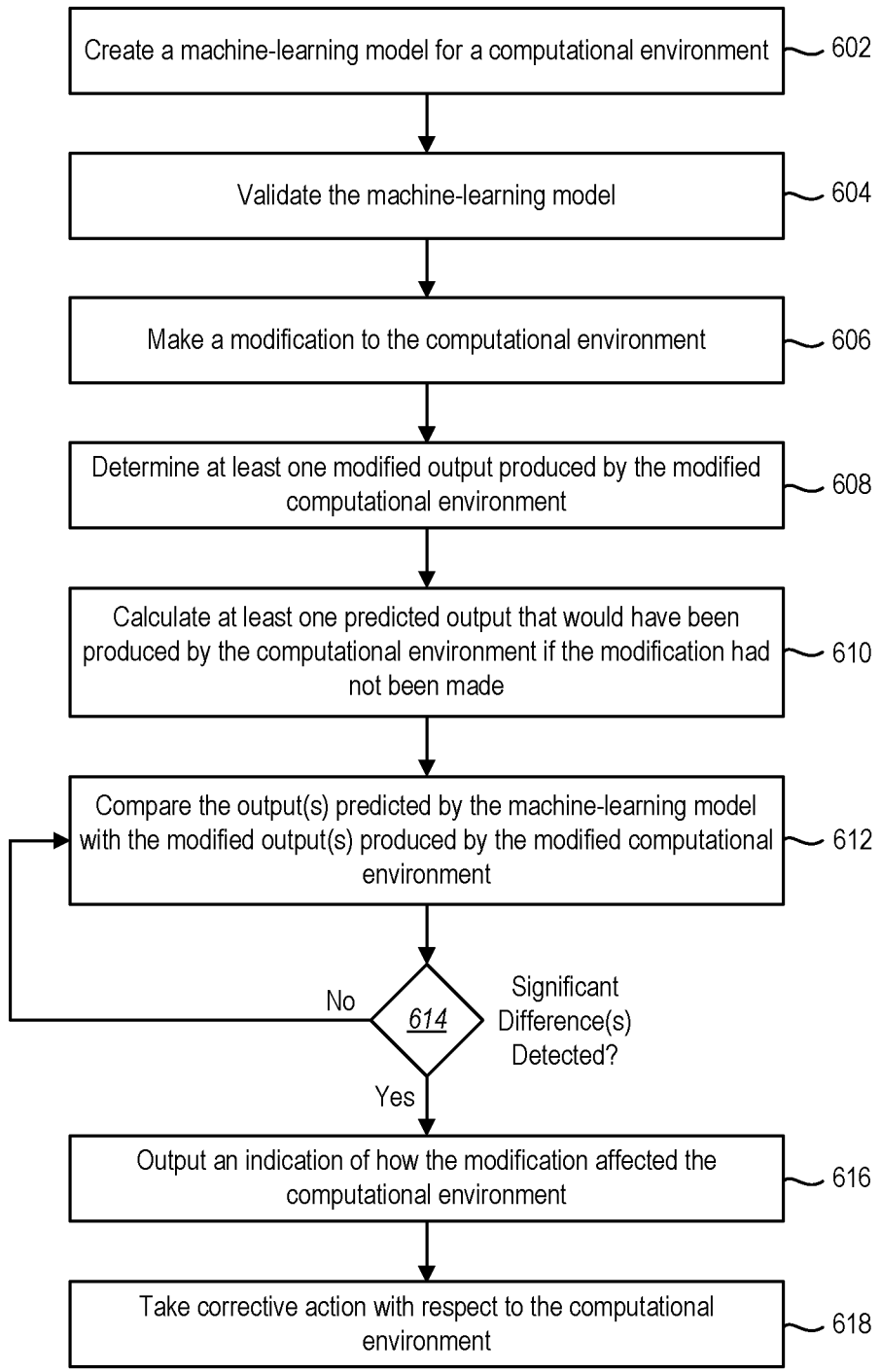
FIG. 6 is a flow diagram that illustrates an example of a method for experimenting with modifications to a computational environment within a distributed system in accordance with the present disclosure.

FIG. 6 is a flow diagram that illustrates an example of a method 600 for experimenting with modifications to a computational environment 102 within a distributed system in accordance with the present disclosure. For the sake of clarity, the method 600 will be explained in relation to the various components of the experimentation framework illustrated in FIGS. 1A-C.

The method 600 involves creating 602 a machine-learning model 104 for a computational environment 102 within a distributed system. Machine-learning techniques may be utilized to train the machine-learning model 104 to predict at least one output 114 that would be produced by the computational environment 102 based on at least one input 106 provided to the computational environment 102. The method 600 may also include validating 604 the machine-learning model 104 to verify that the predicted output(s) 114 satisfy one or more validation conditions 118 with respect to the actual output(s) 108 produced by the computational environment 102. Once the machine-learning model 104 has been validated 604, the machine-learning model 104 may be used to evaluate changes that may be made to the computational environment 102.

More specifically, after a modification 122 has been made 606 to the computational environment 102 (thereby producing a modified computational environment 102a that produces modified outputs 108a), the method 600 may include determining 608 at least one modified output 108a that is produced by the modified computational environment 102a subsequent to the modification 122 being made. The method 600 may also include using the machine-learning model 104 to calculate 610 at least one predicted output 114 that would have been produced by the computational environment 102 if the modification 122 had not been made.

To determine the effects (if any) of the modification 122, the output(s) 114 predicted by the machine-learning model 104 may be compared 612 with the modified output(s) 108a produced by the modified computational environment 102a. If any significant differences are detected between the predicted output(s) 114 and the modified output(s) 108a (e.g., if a difference between a predicted output 114 and a modified output 108a exceeds a defined threshold), then the method 600 may include outputting 616 an indication of how the modification 122 affected the computational environment 102. For example, a summary of any significant differences (e.g., differences that exceed a threshold) between predicted output(s) 114 and modified output(s) 108a may be displayed on one or more display screens. As another example, one or more notification messages may be sent to interested parties, such as an administrator of the computational environment 102. The notification messages may include information about the differences that have been detected between predicted output(s) 114 and modified output(s) 108a.

Under some circumstances, the method 600 may also include taking 618 corrective action with respect to the computational environment 102. For example, if the comparison of the predicted output(s) 114 and the modified output(s) 108a indicates that the modification 122 had a harmful effect on the computational environment 102, then an administrator of the computational environment 102 may undo the modification 122. In other words, the administrator may revert the computational environment 102 back to the way that it was before the modification 122 was made.

Figure 7A:
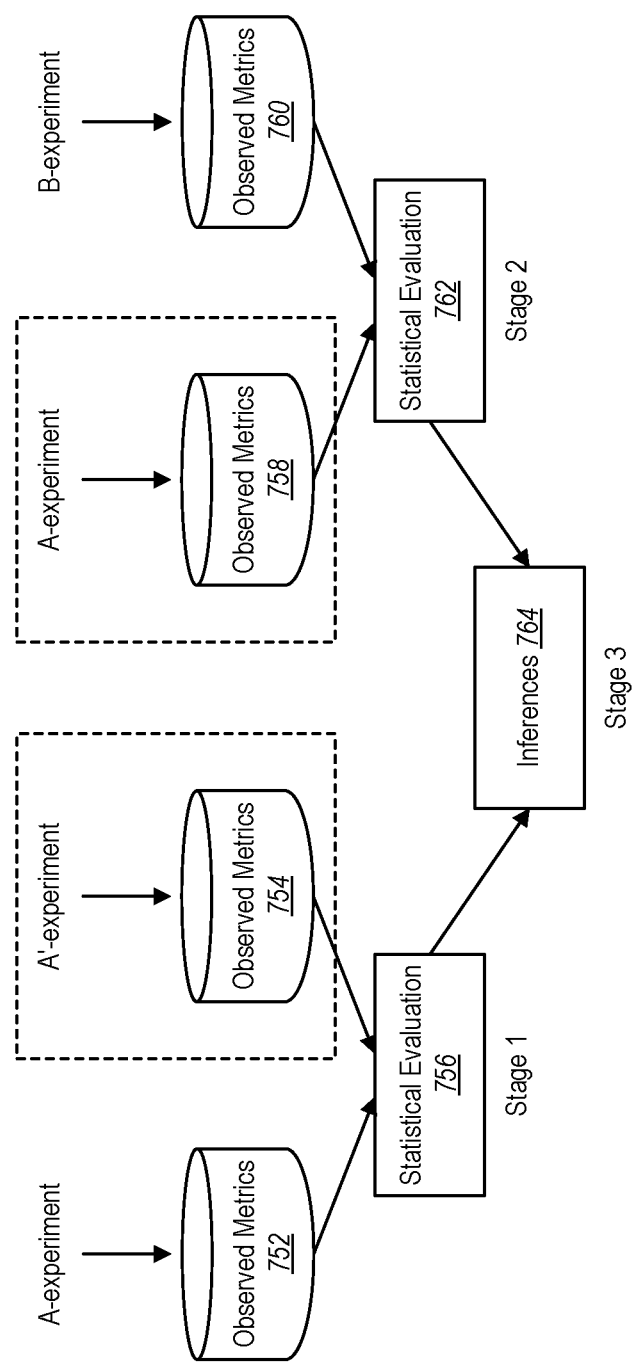
FIGS. 7A-B illustrate a comparison of an experimentation framework in accordance with the present disclosure with conventional A/B testing.
Figure 7B:
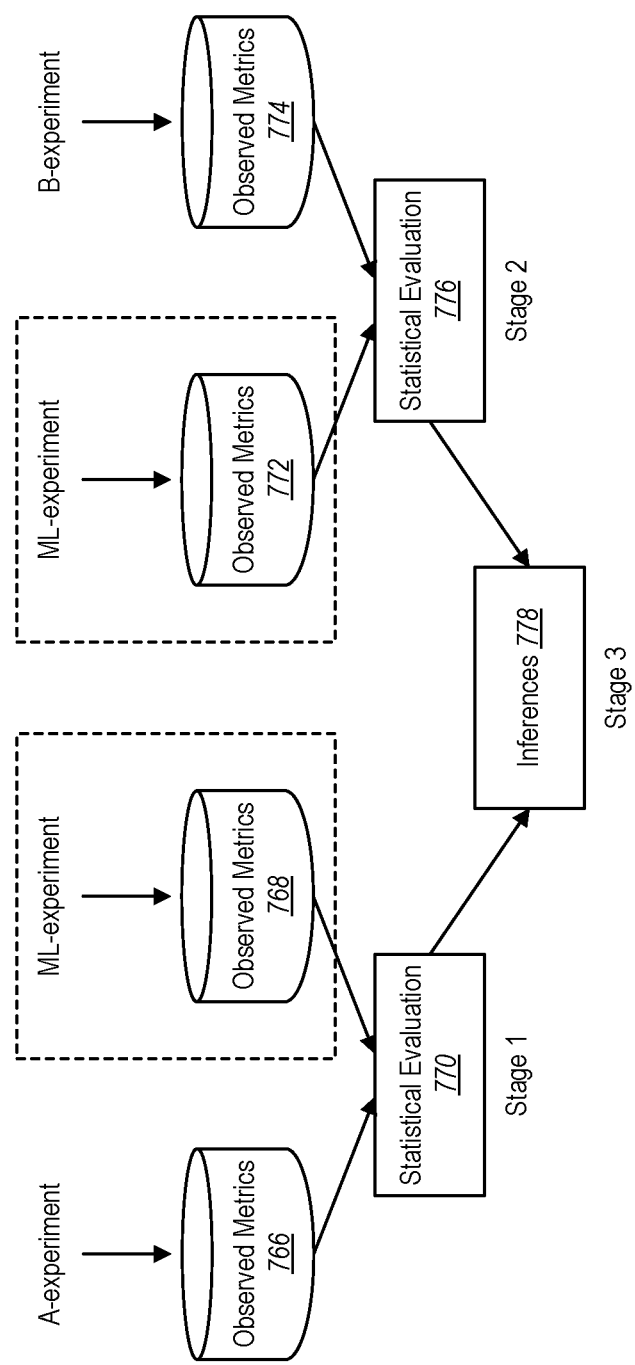

FIGS. 7A-B illustrate a comparison of an experimentation framework in accordance with the present disclosure with conventional A/B testing. Reference is initially made to FIG. 7A, which illustrates an example of a conventional A/B testing framework. Three stages are shown. In stage one, identical code and configuration (which are named A and A' in FIG. 7A) are deployed at two computational environments having identical hardware components. An experiment may be performed to verify the equivalence of the performance of the A computational environment and the performance of the A' computational environment. This experiment may be referred to as an A/A' experiment. The A/A' experiment may be kept running for as long as necessary to collect a sufficient number of values for observed metrics 752 related to the performance of the A computational environment and a sufficient number of values for observed metrics 754 related to the performance of the A' computational environment. A statistical evaluation 756 may be performed with respect to the observed metrics 752, 754. If there are significant differences between the observed metrics 752, 754, then an attempt may be made to identify and correct whatever is causing these differences. The A/A' experiment may be continued until the results of the statistical evaluation 756 are statistically significant and the differences between the observed metrics 752, 754 are negligible. At this point, the overall method may proceed to stage two.

During stage two, code and configuration corresponding to the current release are deployed at one of the computational environments that were tested in stage one, and code and configuration corresponding to the new candidate are deployed at the other computational environment that was tested in stage one. For purposes of stage two, these computational environments may be referred to as an A computational environment (which has the code and configuration corresponding to the current release) and a B computational environment (which has the code and configuration corresponding to the new candidate). An experiment may be performed to evaluate the differences between the performance of the A and B computational environments. This experiment may be referred to as an A/B experiment. The A/B experiment may be kept running for as long as necessary to collect a sufficient number of values for observed metrics 758 related to the performance of the A computational environment and a sufficient number of values for observed metrics 760 related to the performance of the B computational environment. A statistical evaluation 762 may be performed with respect to the observed metrics 758, 760. The A/B experiment may be continued until the results of the statistical evaluation 762 are statistically significant. At this point, the overall method may proceed to stage three.

During stage three, comparisons may be made between the observed metrics 752, 754, 758, 760 and statistical evaluations 756, 762 that have been made, and inferences 764 may be drawn from these comparisons. The deployed changes from the designated hardware components may also be cleaned up during stage three.

An experimentation framework in accordance with the present disclosure may change the components that are wrapped with dashed lines in FIG. 7A. These components may be replaced with machine learning-driven emulations, as depicted in FIG. 7B. In other words, in accordance with the present disclosure, the actual experiment on the second hardware component may be replaced with emulation of the experiment.

With respect to the conventional AB testing shown in FIG. 7A, it should be noted that the process of ensuring equivalence during the A/A' testing can be quite difficult in the context of a complex distributed system (e.g., a cloud computing environment). Using a machine learning-driven emulation in place of the second computational environment can be much simpler than ensuring that the A and A' computational environments perform in the same way with respect to statistical tests. Ensuring that two distinct computational environments receive an equivalent load and process it similarly can be difficult and may require continuous correction.

Reference is now made to FIG. 7B, which illustrates an example of an experimentation framework in accordance with the present disclosure. Again, three stages are shown. During stage one, code and configuration are deployed at a particular computational environment. This is the "A experiment" in FIG. 7B. In addition, a machine-learning emulation of the computational environment (with the deployed code and configuration) may be created. This is the "ML experiment" in FIG. 7B. The machine-learning emulation may be refined until statistical evaluation 770 indicates that the observed metrics 768 corresponding to the machine-learning emulation are substantially equivalent to the observed metrics 766 corresponding to the computational environment itself. At this point, the overall method may proceed to stage two.

During stage two, one or more changes may be made to the computational environment. These changes may be related to the code and configuration that are deployed on the computational environment, and/or to the hardware configuration of the computational environment, and/or to the traffic load experienced by the computational environment. This is the "B experiment" shown in FIG. 7B. A statistical evaluation 776 may be performed with respect to values of the observed metrics 774 associated with the B experiment and values of the observed metrics 772 associated with the ML experiment (which simulates the performance of the computational environment before the changes were made). During stage three, comparisons may be made between the values of the observed metrics 766, 768, 772, 774 and statistical evaluations 770, 776 that have been made, and inferences 778 may be drawn from these comparisons.

There are many possible applications of the experimentation framework disclosed herein. For example, as noted previously, an experimentation framework in accordance with the present disclosure may be utilized to evaluate the effects of particular changes on system performance before those changes are shipped to production, detect regression (degradation in performance) on important metrics after changes have been deployed to production, estimate global improvements to the distributed system performance, and predict changes to performance in the case of changes to traffic.

Figure 8:
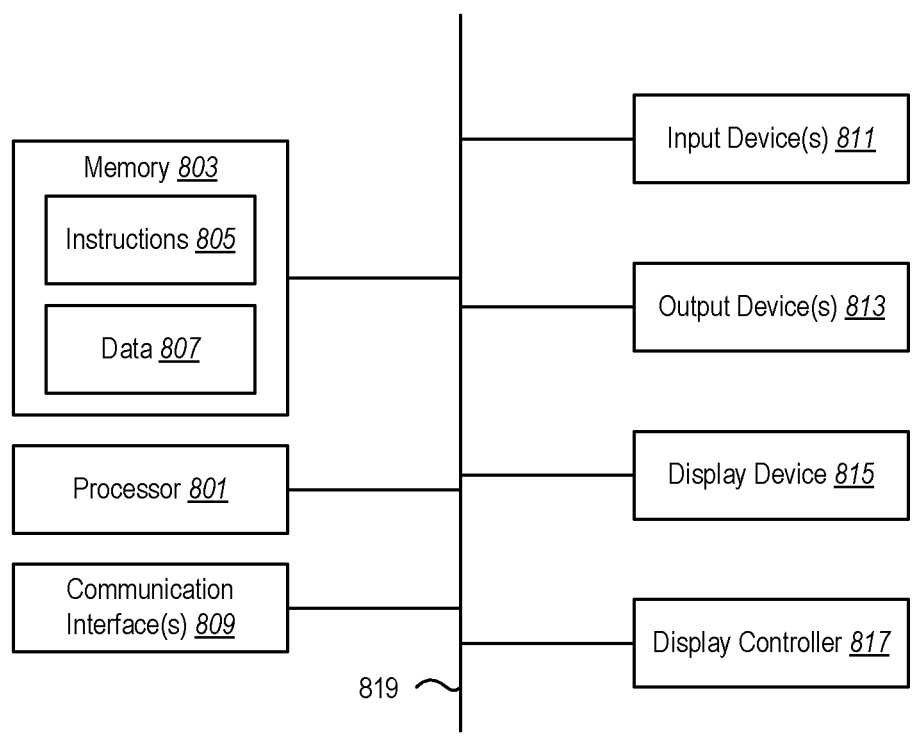
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 7, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the steps, operations, actions, or other functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for experimenting with modifications to a computational environment within a distributed system, comprising:
    identifying a machine learning model trained to predict outputs for a computational environment having a first set of characteristics based on an input provided to the computational environment;
    determining a modified output produced by the computational environment having a second set of characteristics, the second set of characteristics including a characteristic that has been modified from the first set of characteristics;
    applying the machine learning model to the computational environment having the second set of characteristics to determine a predicted output based on the first set of characteristics; and
    comparing the modified output to the predicted output to generate an output indicating an effect of a modification of the characteristic of the second set of characteristics that is different from the first set of characteristics.

2. The method of claim 1, wherein the modified output is produced during an evaluation period after the characteristic has been modified from the first set of characteristics of the computational environment.

3. The method of claim 1, wherein identifying the machine learning model includes receiving a machine learning model that has previously been trained and validated with respect to the computational environment having the first set of characteristics.

4. The method of claim 1, wherein identifying the machine learning model includes generating the machine learning model and validating the machine learning model to verify that the predicted output satisfies a validation condition with respect to the modified output.

5. The method of claim 1, wherein determining the predicted output includes:
    providing the input to a simulated computational environment having the second set of characteristics, and
    utilizing the machine learning model to simulate performance of the computational environment as if the characteristic had not been modified from the first set of characteristics.

6. The method of claim 1,
    wherein the machine learning model is trained subsequent to the characteristic being modified to the second set of characteristics,
    wherein the machine learning model is trained based on historical data.

7. The method of claim 1, wherein the modification of the characteristic is a modification of a software configuration of the computational environment.

8. The method of claim 1, wherein the modification of the characteristic is a modification of a hardware configuration of the computational environment.

9. The method of claim 1, wherein the modification of the characteristic is a modification of a traffic load associated with the computational environment.

10. The method of claim 1, wherein the output is generated in response to detecting that a difference between the modified output and the predicted output exceeds a threshold.

11. The method of claim 1, further comprising taking corrective action with respect to the computational environment in response to the output indicating the effect of the modification of the characteristic.

12. The method of claim 1, wherein applying the machine learning model to the computational environment to determine the predicted output includes calculating the predicted output that would have been predicted by the computational environment if the characteristic had not been modified from the first set of characteristics.

13. The method of claim 1, wherein comparing the modified output to the predicted output includes producing comparison information that shows a measured difference between the modified output and the predicted output.

14. A system, comprising:

at least one processor;

memory in electronic communication with the at least one processor; and instructions stored in the memory, the instructions being executable by the at least one processor to:

identify a machine learning model trained to predict outputs for a computational environment having a first set of characteristics based on an input provided to the computational environment;

determine a modified output produced by the computational environment having a second set of characteristics, the second set of characteristics including a characteristic that has been modified from the first set of characteristics;

apply the machine learning model to the computational environment having the second set of characteristics to determine a predicted output based on the first set of characteristics; and compare the modified output to the predicted output to generate an output indicating an effect of a modification of the characteristic of the second set of characteristics that is different from the first set of characteristics.

15. The system of claim 14, wherein the modified output is produced during an evaluation period after the characteristic has been modified from the first set of characteristics of the computational environment.

16. The system of claim 14, wherein the machine learning model is trained subsequent to the characteristic being modified to the second set of characteristics, wherein the machine learning model is trained based on historical data.

17. The system of claim 14, wherein the modification of the characteristic is one or more of:

a modification of a software configuration of the computational environment;

a modification of a hardware configuration of the computational environment; or a modification of a traffic load associated with the computational environment.

18. The system of claim 14, wherein the output is generated in response to detecting that a difference between the modified output and the predicted output exceeds a threshold.

19. The system of claim 14, further comprising instructions being executable by the at least one processor to take corrective action with respect to the computational environment in response to the output indicating the effect of the modification of the characteristic.

20. A non-transitory computer readable medium storing instructions thereon that, when executed by at least one processor, causes a computing device to:

identify a machine learning model trained to predict outputs for a computational environment having a first set of characteristics based on an input provided to the computational environment;

determine a modified output produced by the computational environment having a second set of characteristics, the second set of characteristics including a characteristic that has been modified from the first set of characteristics;

apply the machine learning model to the computational environment having the second set of characteristics to determine a predicted output based on the first set of characteristics; and compare the modified output to the predicted output to generate an output indicating an effect of a modification of the characteristic of the second set of characteristics that is different from the first set of characteristics.

* * * * *